July 24, 1951     C. B. WILDE     2,562,158
PROCESS FOR PRODUCING CRYSTALLINE SULFUR
Filed June 2, 1950
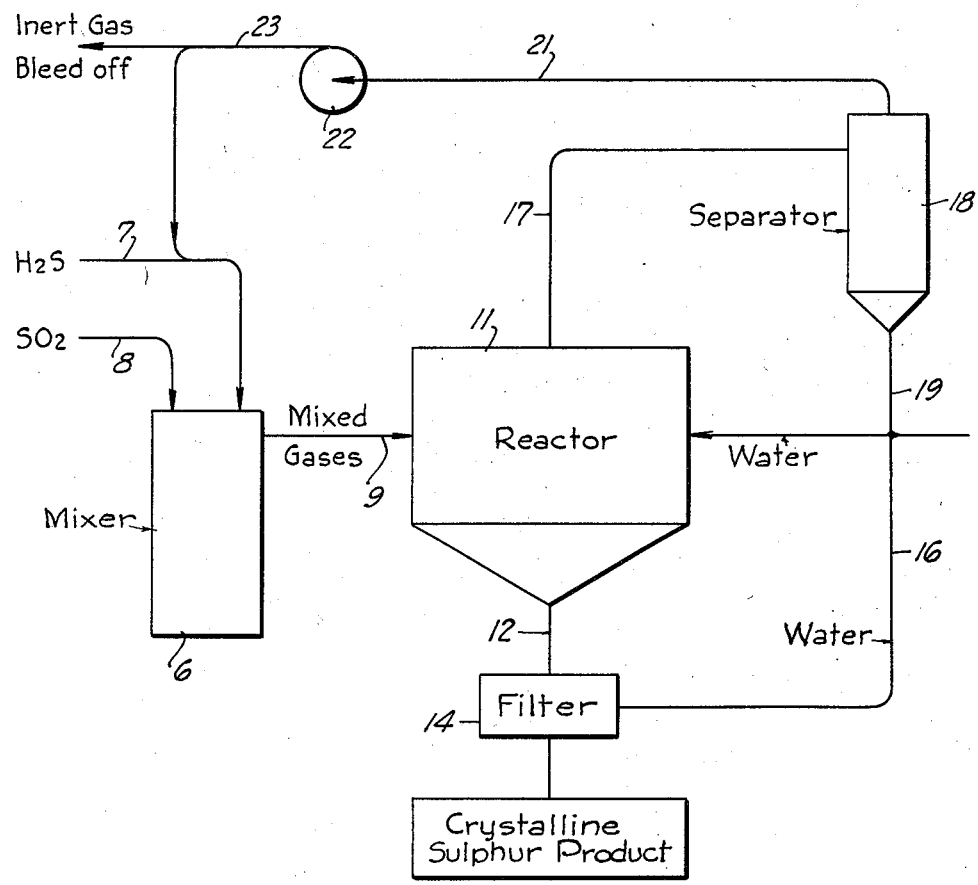
INVENTOR
*Cecil B. Wilde*
BY
ATTORNEY Patented July 24, 1951

2,562,158

UNITED STATES PATENT OFFICE 2,562,158

PROCESS FOR PRODUCING CRYSTALLINE SULFUR

Cecil B. Wilde, Compton, Calif., assignor to Stauffer Chemical Company, a corporation of California Application June 2, 1950, Serial No. 165,850

5 Claims. (Cl. 23—226)

This is a continuation-in-part of application Serial No. 35,645, filed June 28, 1948, now abandoned.

This invention relates to a process for preparing crystalline sulfur by reaction of hydrogen sulfide with sulfur dioxide.

It is old to produce sulfur by the reaction:

$$2H_2S + SO_2 \rightarrow 2H_2O + 3S$$

This reaction has been carried on by utilizing stoichiometric quantities of the two reagents, by using excess $SO_2$, and by operation in the presence of various added ingredients used for purposes of affecting the condition of the sulfur produced, avoiding or minimizing the co-production of unwanted reaction products such as thionic acids, sulfuric acid, etc., and for other reasons.

In all the processes with which I am familiar, however, the sulfur produced is in an amorphous condition. The common practice of the reaction gives rise to a colloidal precipitate which is very difficult to wash, filter, and otherwise process. Especially in the cases where foreign substances are used for one purpose or another, it is practically impossible to accomplish complete removal of these substances from the precipitated sulfur.

It is an object of my invention to provide a process for carrying on the reaction between hydrogen sulfide and sulfur dioxide in such fashion and under such conditions as to produce a crystalline precipitate of elemental sulfur, rather than a colloidal suspension or amorphous precipitate.

I have found that if the reaction is carried on under conditions presently described, the elemental sulfur is produced in crystalline or micro-crystalline form, settles rapidly, and has physical qualities which render it quite easy to wash, filter, and dry.

The most important factor which I have found necessary in order to secure the production of crystalline sulfur, is that the hydrogen sulfide should be in excess of the stoichiometric proportions. This excess should be from about three times to about fifteen times the combining or equivalent quantities; on a molal basis, these limits should be doubled since two mols of hydrogen sulfide are required to react with one mol of sulfur dioxide. Below an excess of about three times, only amorphous sulfur is produced, while about this quantity and up to the upper limit, the most noticeable difference is in the size of the crystals. As the excess increases, the crystals become smaller. For example, at an optimum of about 7.5 to 1, the crystals produced were within a range of from ½ micron to 6 microns in major dimension. No added advantage is gained by using excesses over about 15 to 1 sufficient to compensate for the increased expanse due to enlarged volume of reaction apparatus and recycle gas.

In the drawing accompanying and forming a part hereof, the single figure is a schematic showing of suitable apparatus and a flow sheet which can be employed to practice the invention. Hydrogen sulfide is fed into a mixer 6 through pipe 7 and is mixed with sulfur dioxide from pipe 8. The gas mixture is fed through line 9 into reactor 11, which is partially filled with water. A slurry of sulfur crystals and water is taken off the bottom of the reactor through line 12 and thence to filter 14, the water being returned to the reactor through line 16. Excess hydrogen sulfide is taken off from the top of the reactor by line 17 to separator 18 to remove entrained water which is returned through line 19 to the reactor. The hydrogen sulfide is taken off the separator by line 21 and is returned by pump 22 and line 23 to line 7 or a portion is bled off to remove fixed or inert gases present. The sulfur product taken off the filter is finely divided and of a crystalline nature so long as the hydrogen sulfide feed exceeds the sulfur dioxide feed by at least five times.

The crystalline product exhibits a property of taking up odors; when made at 180° F., the product is ordinarily odorless. It is therefore preferred to operate at a relatively elevated temperature of from 180° F. up to the boiling point of water. This temperature range is not essential in the operation of the process, however, and crystalline sulfur may be produced at any temperature between the freezing and boiling points of water, but crystallizes more slowly at the lower temperatures. The process can be carried out at a temperature of from about 120° F. to about 212° F.

Excess hydrogen sulfide which is not combined with sulfur dioxide in the reaction is recirculated to the reaction by being added to the mixture of incoming gases. The quantities of hydrogen sulfide and sulfur dioxide continuously added to the reaction will, of course, be those required by the equation:

$$(x) H_2S + SO_2 \rightarrow 2H_2O + 3S + (x-2) H_2S$$

where $x$ is about 6 or any value greater than 6 and up to about 30.

It is not necessary to operate with pure hydrogen sulfide and sulfur dioxide, but by-product or waste gases including these materials may be reacted, inert diluents therein not adversely affecting the reaction. Sufficient of the dilute gases will be utilized in order to provide the required relation between the quantities as set forth above. Of course, any other substance present should not react with the hydrogen sulfide, the water, the sulfur dioxide or the sulfur produced.

I find that there is a minimum production of side reaction products, and to a certain extent the water separated from the precipitated sulfur slurry may be re-used in the process, to avoid loss of dissolved $SO_2$.

The sulfur produced is easily washed and filtered, but inasmuch as it is produced in the absence of foreign substances, it requires only a minimum of washing, and I find that by washing the product once with distilled water I am able to produce a precipitated sulfur which meets U. S. P. standards of purity. The washed product dries rapidly and does not subsequently aggregate into large particles.

I claim:

1. A process for producing crystalline sulfur comprising mixing from about 6 to about 30 mols of $H_2S$ with a mol of $SO_2$, introducing the mixture into an aqueous medium to form crystalline sulfur, and recovering the crystalline sulfur.

2. A process for producing crystalline sulfur comprising mixing from about 6 to about 30 mols of $H_2S$ with a mol of $SO_2$, introducing the mixture into an aqueous medium held at a temperature of at least 180° F. to form crystalline sulfur, and recovering the crystalline sulfur.

3. A process for producing crystalline sulfur comprising mixing from about 6 to about 30 mols of $H_2S$ with a mol of $SO_2$, introducing the mixture into an aqueous medium held at a temperature of from about 120° F. to about 212° F. to form crystalline sulfur, and recovering the crystalline sulfur.

4. A process for producing crystalline sulfur comprising carrying on the reaction $$(x) H_2S + SO_2 \rightarrow 2H_2O + 3S + (x-2) H_2S$$

where $x$ is any value from about 6 to about 30, in an aqueous medium to form crystalline sulfur, and recovering the crystalline sulfur.

5. A method for preparing crystalline sulfur comprising passing a mixture including from about 6 to about 30 mols of $H_2S$ and 1 mol of $SO_2$ through water at about 180° F. to produce crystalline sulfur, and recovering the crystalline sulfur.

CECIL B. WILDE.

No references cited.